May 3, 1966 R. D. WOLCOTT 3,248,875
RE-STARTABLE SOLID FUEL ROCKET MOTOR
Filed Oct. 27, 1964

INVENTOR.
Robert D. Wolcott
BY: Harry M. Saragovitz,
Edward J. Kelly +
Herbert Berl 3,248,875
RE-STARTABLE SOLID FUEL ROCKET MOTOR
Robert D. Wolcott, Juneau, Alaska, assignor to the United
States of America as represented by the Secretary of
the Army
Filed Oct. 27, 1964, Ser. No. 406,942
3 Claims. (Cl. 60—35.6)

The invention described herein may be manufactured and used by or for the Government for governmental purposes, without the payment to me of any royalty thereon.

This inventon relates to rocket motors and more particularly to those employing solid propellants.

In general, the thrust of a rocket is equal to the product of the mass flow rate and the effective exhaust velocity. If a large thrust is desired then a large mass flow can be achieved by the use of a large burning surface, a high burning rate, or a combination of these factors.

Heretofore, since a given combustion chamber is able to hold only a specified amount of propellant, the variation of thrust for any given specific propellant has been obtained by varying the shape of the charge or grain to govern the exposed burning surface. For this purpose many types of geometrical configurations have been utilized but the usual aim of these various shapes is to obtain a constant burning of the propellant so as to obtain a resultant constant thrust.

The object of this invention is to provide an improved solid propellant rocket motor using a plurality of solid propellant members each with a separate ignition system.

Such an arrangement can be regulated to produce a constant thrust but this invention is concerned primarily with a variable thrust that can proceed as far as completely consuming the first stage before activating the second propellant, etc. It therefore has the capability of restarting the next stage even though the previous stage has been completely burned out.

One example of a device with such a capability is illustrated in the drawings in which.

Figure 1:
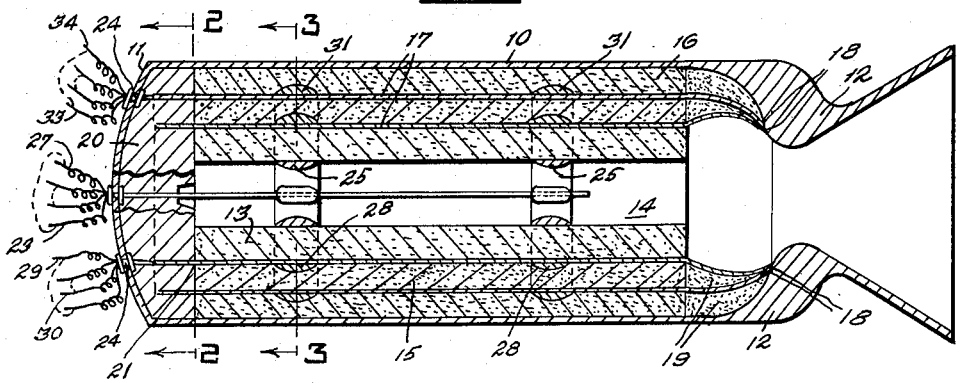
FIGURE 1 is a longitudinal section of a rocket motor.
Figure 2:
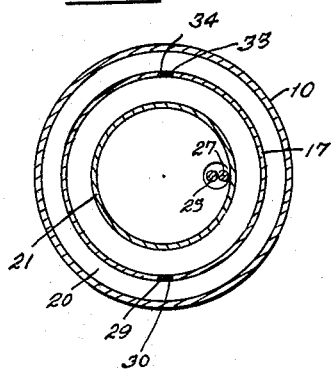
FIGURE 2 is a cross sectional view taken on the 2—2 line of the rocket motor in FIGURE 1.
Figure 3:
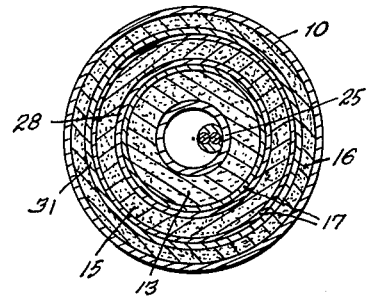
FIGURE 3 is a cross sectional view taken on the 3—3 line of FIGURE 1.

In the drawings, the tubular shell or rocket chamber 10 is closed at the forward end 11 and open at the opposite end forming a nozzle 12. The solid propellant charge consists of three concentric tubular charges in which the inner charge 13 has a passage 14 through the center for burning, an intermediate charge 15 and an outer charge 16. While the illustration shows three charges it should be understood that two charges may be used or more than three charges may also be used with no material change in the device. The charges are separated by a heat insulating metal foil 17 which provides a flame barrier from the preceding ignited layer of propellant and causes the flame to extinguish at that point due to lack of buring material. The metal foil 17 is scored at 18 where it joins the nozzle 12 to more readily permit its separation from the nozzle when ruptured. Also at the neck of the nozzle the foil 17 is separated and insulated by inert granular material 19 to prevent end burning. The closed end of the rocket chamber 10 is provided with an end cap 20 having circular recesses 21 into which the forward ends of the foil 17 extend and are bonded. The recesses 21 are also utilized as means of running the ignition wires through the insulators 24 to separate outside means (not shown) for activating separately the several charges. The inner charge 13 has the igniter bands 25 on the interior surface and they may be activated separately by connectors 23 and 27, or these connections may be joined as shown by the dotted lines, so that they may be activated at the same time. The intermediate charge 15 is provided with igniter bands 28 located just below the metal foil 17 and embedded in the surface of the charge with connections 29 and 30 to outside ignition means for restarting the burning after the inner or initial charge 13 has burned. The outer charge 16 is similarly provided with igniter bands 31 connected to leads 33 and 34 and these bands may also be activated either in unison or individually after the intermediate charge 15 has burned out.

In operation, the variable thrust desired is obtained by activating the inner charge 13 through the electrical connections 23 and 27 to the igniter bands 25 either separately or in unison and this charge is burned to completion without affecting the adjacent charge due to the protection of the metal foil 17; then the rocket motor is restarted by the activation of the intermediate charge 15 by the electrical connections 29 and 30 to the igniter bands 28 in the same manner as before, thereafter the pressure generated by the burning of the charge 15 ruptures the foil 17 which is blown out the nozzle 12 and the separation is facilitated by the scored connection of the foil at 18 and this charge burns to completion; after which thrust is again provided and the rocket motor restarted by the activation of the outer charge 16 through the electrical connections 33 and 34 to the igniter bands 31 and the burning charge punctures the metal foil 17 between the intermediate charge 15 and the outer charge 16 and is blown out the nozzle 12 and this separation is also facilitated by the scoring of the foil at 18.

This rocket motor therefore has the capability of restarting succeeding charges after the previous charge has completely burned out and has the effectivness of several motors of selected thrust combined on one chamber and this feature is only limited to the number of concentric layers employed and the amount of thrust required.

The igniter bands may be connected to a manual or automatic sequential or any selective firing device to supply the electric current necessary to activate the igniter. The system may differ only in that the initial activation may be accomplished by a simple black powder type of igniter but those embedded in the remaining layers must of necessity be heat resistant and probably catalytic derived type of igniters i.e. a type of igniter which requires more than heat alone to start its chemical reaction and once activated electrically it would ignite the next layer but would do so only on command or automatic selection by the control device.

It should be noted that while the rocket motor shown in the drawing is that of a hollow restricted burning type, it is readily apparent that this restartable feature may also be applied to an end burning restricted type motor with equal success and for the same purposes heretofore pointed out. It is also recommended that the outside periphery of the propellant next to the metal foil barrier be highly opacified to absorb the heat of the reaction of the burning propellant and thereby prevent rapid thermal decomposition of the remaining portion of the burning layer and the adjacent unignited layer.

In addition to the use of this particular restartable rocket motor where a variable thrust is desirable and due to the fact that it has more than one graduated charge in a single motor, it also has the capability of being used as a motor in miniature corrective and control devices.

What is claimed is:

1. A restartable rocket motor comprising an elongated firing chamber closed at the forward end and opening rearwardly through a nozzle, a solid propellant within said chamber comprising an elongated concentric cylindrical charges, a complete heat restricting material separating said cylindrical charges from each other, an insulating cap in the forward end of the chamber closing one end of all of the cylindrical charges, said cap having circular recesses adjacent the charges to receive and maintain the restricting material, means for igniting the innermost charge and separate ignition means for each remaining charge for restarting the adjacent charge after the succeeding inner charge has burned.

2. A restartable rocket motor comprising an elongated firing chamber closed at the forward end and opening rearwardly through a nozzle, a solid propellant within said chamber comprising an elongated concentric cylindrical charges, an inner charge, an intermediate charge and an outer charge arranged to be consumed in that order, a complete heat restricting material separating the charges from each other, an insulating cap in the forward end of the chamber closing one end of all of the cylindrical charges, said cap having circular recesses adjacent the charges to receive and maintain the restricting material, means for igniting the innermost charge and separate ignition means for each remaining charge for restarting the adjacent charge after the succeeding inner charge has burned, the restricting material covering the interior portion of both the interior of the intermediate and outer charges being in turn ruptured and blown out the nozzle by pressure generated within the respective charges.

3. A restartable rocket motor comprising an elongated firing chamber closed at the forward end and opening rearwardly through a nozzle, a solid propellant within said chamber comprising elongated concentric cylindrical charges, an inner charge, an intermediate charge and an outer charge, a complete heat restricting material separating the charges from each other, a pair of spaced igniter bands for each charge separated from the adjacent charge by the restricting material, an insulating cap in the forward end of the chamber closing one end of all the cylindrical charges, said cap having circular recesses adjacent the charges to receive and maintain the restricting material, each igniter band having individual electrical connections passing through said circular recesses to the outside activating means, said means igniting the innermost charges and separate ignition means for each remaining charge for restarting the adjacent charge after the succeeding inner charge has burned, the restricting material covering the interior portion of both the interior of the intermediate and outer charges being in turn ruptured and blown out the nozzle by pressure generated within the respective charges.

References Cited by the Examiner

UNITED STATES PATENTS

| 2,956,401 | 10/1960 | Kane | 60—39.47 X |
| 3,023,570 | 3/1962 | Crouch | 60—35.6 |
| 3,128,600 | 4/1964 | Oldham | 60—39.47 X |

MARK NEWMAN, *Primary Examiner.*

CARLTON R. CROYLE, *Assistant Examiner.*